(12) United States Patent
Wallace et al.

(10) Patent No.: US 8,675,355 B2
(45) Date of Patent: Mar. 18, 2014

(54) RELEASE MECHANISM WITH PRE-TRAVEL

(75) Inventors: Brian William Wallace, Raleigh, NC (US); John David Swansey, Durham, NC (US); Robert Paul Tennant, Raleigh, NC (US); XiaoSong Xia, Beijing (CN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 361 days.

(21) Appl. No.: 13/049,122

(22) Filed: Mar. 16, 2011

(65) Prior Publication Data

US 2012/0236492 A1 Sep. 20, 2012

(51) Int. Cl.

| | |
|---|---|
| ***G06F 1/16*** | (2006.01) |
| ***H05K 5/00*** | (2006.01) |
| ***H05K 7/00*** | (2006.01) |

(52) U.S. Cl.
USPC ................................ 361/679.33; 361/679.37

(58) Field of Classification Search
USPC ............ 361/679.01, 679.02, 679.31–679.33, 361/679.37–679.39
See application file for complete search history.

(56) References Cited

U.S. PATENT DOCUMENTS

| | | | | |
|---|---|---|---|---|
| 8,035,961 | B2 * | 10/2011 | Figuerado et al. | 361/679.37 |
| 8,246,129 | B2 * | 8/2012 | Wang et al. | 312/332.1 |
| 8,300,398 | B2 * | 10/2012 | Zhang et al. | 361/679.33 |
| 2008/0266781 | A1 * | 10/2008 | Olesiewicz et al. | 361/685 |
| 2011/0038110 | A1 * | 2/2011 | Ikunami | 361/679.01 |
| 2012/0236487 | A1 * | 9/2012 | Wallace et al. | 361/679.31 |
| 2012/0236491 | A1 * | 9/2012 | Wallace et al. | 361/679.33 |
| 2012/0236493 | A1 * | 9/2012 | Wallace et al. | 361/679.37 |

* cited by examiner

*Primary Examiner* — Bernard Rojas
(74) *Attorney, Agent, or Firm* — Brian J. Pangrle

(57) ABSTRACT

An assembly can include a base with a hinge axis, a hinge end, an opposing end, a latch surface disposed intermediate the hinge end and the opposing end, a latch with a prong and an actuation surface, and a button seat disposed intermediate the latch surface and the opposing end where the button seat includes a button stop; a spring; and a button configured for translation in the button seat where the button includes a retainer and a latch contacting surface extending outwardly away from a back side where, for an un-depressed orientation, the spring biases the retainer against the button stop to maintain a gap between the latch contacting surface and the actuation surface of the latch. Various other apparatuses, systems, methods, etc., are also disclosed.

20 Claims, 8 Drawing Sheets

RELEASE MECHANISM WITH PRE-TRAVEL

TECHNICAL FIELD

Subject matter disclosed herein generally relates to technology for a media drive assembly configured, for example, for installation in a server unit.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

Conventional server units include bays for installation of media drives such as hard disk drives (HDDs). Such media drives are usually carried in an assembly that allows for installation and removal of a media drive. Often, such an assembly includes a handle with a release button that, when depressed, causes release of the handle, which may swing out away from a unit (e.g., consider a server unit in a server rack or tower). Accidental or otherwise unintended release of “touchy” buttons can occur during shipping of a media drive assembly, while a media drive assembly is stored, while a media drive is installed in a unit, etc. As described herein, various arrangements provide for reducing or otherwise minimizing accidental or otherwise unintended release of a handle of a media drive assembly.

SUMMARY

An assembly can include a base with a hinge axis, a hinge end, an opposing end, a latch surface disposed intermediate the hinge end and the opposing end, a latch with a prong and an actuation surface, and a button seat disposed intermediate the latch surface and the opposing end where the button seat includes a button stop; a spring; and a button configured for translation in the button seat where the button includes a retainer and a latch contacting surface extending outwardly away from a back side where, for an un-depressed orientation, the spring biases the retainer against the button stop to maintain a gap between the latch contacting surface and the actuation surface of the latch. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
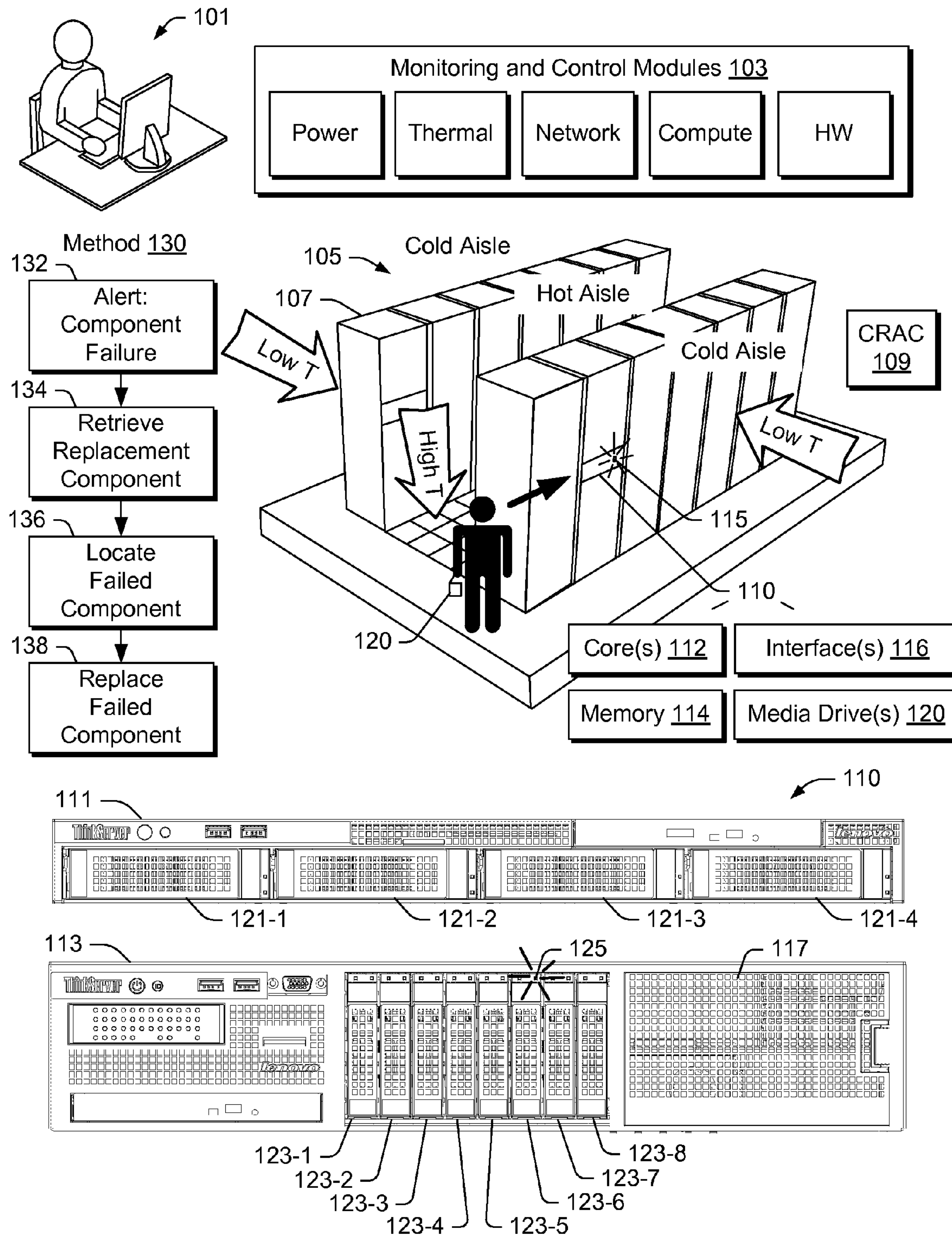
FIG. 1 is a series of diagram related to examples of servers and server operations.

FIG. 1 shows an individual at a control station 101 where the control station 101 may operate in conjunction with one or more modules such as one or more of the monitoring and control modules 103. In the example of FIG. 1, the modules 103 include a power module, a thermal module, a network module, a compute module and a hardware module. The modules 103 may be configured to monitor and control a group of servers 105, which may be arranged in rack towers 107. For example, each of the rack towers 107 may include one or more server unit 110. Each server unit 110 may include one or more processing cores 112, memory 114, one or more interfaces 116 and one or more media drives 120. As an example, each server unit 110 may be configured to access information stored in a media drive 120, transfer accessed information to memory 114, perform computational operations on information in memory 114 and communicate results from computational operations via an interface 116 (e.g., a network interface). As another example, each server unit 110 may be configured to receive information via an interface 116, transfer such information to memory 114 and store such information in a media drive 120. As described herein, each server unit 110 may be configured according to one or more of the foregoing examples or additionally or alternatively according to one or more other manners of operation. Further, as described herein, a server unit includes a server chassis, for example, configured from materials such as metal, plastic, etc., for seating various components.

FIG. 1 also shows a computer room air conditioning (CRAC) unit 109. The CRAC unit 109 is typically a device that monitors and maintains temperature, air distribution and humidity in a network room or data center. In the example of FIG. 1, the CRAC unit 109 may be controlled, monitored, etc., via the one or more modules 103 (e.g., via the control station 101). Mainframes and racks of servers can get as hot as a seven-foot tower of powered toaster ovens, so climate control is an important part of a data center's infrastructure. There are a variety of ways that a CRAC unit can be situated. As an example, a CRAC unit setup can process cooling air and dispense the cooling air (e.g., through an elevated floor). In such an example, cold air flows through the racks (e.g. from “cold aisles”) where it picks up heat before exiting from the rear of the racks (e.g., to “hot aisles”) and returns to the CRAC unit intake(s). CRAC units in a data center can consume a large fraction of total operational energy. For example, CRAC units may consume 25% or more of the total electricity used by a data center.

FIG. 1 shows two examples of server units 111 and 113. The server units 111 and 113 have substantially rectangular faces configured with bays that seat one or more media drives. As described herein, a bay may refer to an opening defined by at least two walls, which may be configured to receive one or more media drives (e.g., in media drive trays). Each position in a bay configured to receive more than one media drive may be referred to as a media drive bay. Server units such as the units 111 and 113 may be stackable in the towers 107 of the group 105. The example server unit 111 includes four horizontally oriented bays that seat four media drives 121-1, 121-2, 121-3 and 121-4. The example server unit 113 includes a large bay configured with eight vertically oriented media drive bays that seat eight media drives 123-1, 123-2, 123-3, 123-4, 123-5, 123-6, 123-7 and 123-8. The server unit 113 also includes a flush, vented cover 117 that covers an additional unused bay, which upon removal of the cover may optionally seat up to eight additional media drives. As described herein, a media drive may be a hard disk drive (HDD), a solid-state drive, an optical drive or other type of media drive. A HDD may be a standard 2.5 inch drive, a standard 3.5 inch drive or another drive.

Where media drives generate heat, heat is transfer to a cooling fluid (e.g., air), which causes the fluid to rise from an inlet temperature $T_{in}$ to an outlet temperature $T_{out}$. Referring to the examples of FIG. 1, the server unit 111 allows for flow around each media drive 121-1, 121-2, 121-3 and 121-4 as seated in their respective bays. In the server unit 113, heat may be transferred from a media drive (see, e.g., 123-1 to 123-8) to cooling fluid flowing in a gap between adjacent media drives or between a media drive and a wall component of a bay. Heat transfer may be characterized at least in part by the equation: $\Delta Q/\Delta t=h_{plate}A(T_{plate}-T_{in})$. In this equation, the flux of energy ($\Delta Q/\Delta t$) is equal to the heat transfer coefficient for a plate ($h_{plate}$), the area of the plate (A) and the temperature difference between the plate and the cooling fluid ($T_{plate}-T_{in}$). For such an equation, a plate may be a surface of a media drive or other component of a server unit. Heat transfer may optionally be characterized by Reynolds number (ratio of inertial forces to viscous forces), Prandtl number (ratio of kinematic viscosity and thermal diffusivity), Nusselt number (ratio of convective to conductive heat transfer across a surface) or Grashof number (ratio of the buoyancy to viscous force acting on a fluid).

As described herein, velocity of cooling fluid can be important for effective cooling and managing energy costs. In particular, axial velocities (e.g., z direction into a bay) of fluid flowing adjacent a media drive seated in a media drive assembly can be important. As described herein, a media drive assembly can act to increase heat transfer coefficient ($h_{plate}$), compared to a conventional media drive assembly. Heat transfer depends on various factors. Where obstructions to flow exist, flow is impeded, which diminishes momentum and typically velocity (e.g., for constant cross-sectional flow area). Accordingly, as described herein, various media drive assembly components can allow for a more unimpeded flow and enhancement of flux of energy from a media drive to a cooling fluid.

As described herein, various keyed components can ensure that media drive assemblies are installed properly into a bay or bays. For example, for the server unit 113, the media drives 123-1 to 123-8 are seated in a relatively uniform manner whereby clearances and heat generation and transfer patterns may be fairly well-known or otherwise understood a priori. More specifically, where conventional components allow for more than one orientation of a media drive in a bay, the selected orientation may not correspond to the most favorable orientation for purposes of heat transfer (e.g., for cooling). Indeed, one side of a media drive may get hotter than another side and where multiple orientations are possible, an operator may install two hot sides adjacent each other. Such situations can give rise to local temperature control issues, which may compromise operation (e.g., increase risk of failure, decrease longevity, etc.). Accordingly, as described herein, keyed components, optionally in combination with other components or features, can act to decrease uncertainty as to cooling and promote operational certainty.

FIG. 1 shows an example of a method 130 that includes an alert block 132, a retrieval block 134, a locate block 136 and a replace block 138. For example, a monitoring module may detect failure of a component in the group 105 and, per the alert block 132, issue an alert. As described herein, an alert may include lighting a diode associated with the failed component. For example, each tower in a server group (or server farm) may include a series of diodes where an alert causes emission of light from a diode where the light is transmitted via a light pipe (or guide) to a face of a server unit (see, e.g., end of light pipe 115 as associated with the server unit 110). Per the method 130, a retrieval block 134 calls for retrieval of a replacement component, which may be a manual or automated (e.g., robotic) process. Per the locate block 136, the failed component is located, for example, by an operator that may visually inspect the towers and associated server units to locate the particular, failed component. Again, in the example of FIG. 1, the light pipe end 115 facilitates visual location of a failed component. Once located, per the replace block 138, an operator may remove the failed component and replace it with the retrieved replacement component.

In general, the method 130 should be performed in a timely and accurate manner. As described herein, a server unit may include a substantially flush face such that visual inspection of a tower or group of towers readily reveals a status indicator (e.g., diode, end of light pipe, etc.). For example, the server unit 111 or the server unit 113 may be configured with a substantially flush face to avoid blocking emission of light from a status indicator and to allow for viewing of a status indicator from wide angles and many lines of sight. For example, the server unit 113 includes the media drive 123-6 with a status indicator 125 that can emit light in wide angle cone, substantially free from interference from other features of the server unit 113. As described herein, keyed components (e.g., of a bay, a tray, a bay and tray, etc.) that promote uniformity can also decrease visual complexity and allow for an enhanced visual environment that facilitates locating and replacing troubled components.

Referring to the example server units 111 and 113, visual uniformity is enhanced by providing media drive assemblies with vented handles where the vents have a pattern that matches other vent patterns of the server units 111 and 113. For example, the server units 111 and 113 include rectangular air flow passages over various portions of their faces, including the handles of the media drive assemblies 121-1, 121-2 and 121-3 as well was 123-1 to 123-8. Accordingly, when a status light is illuminated, the reduced visual complexity of the vents actually enhances a user's ability to locate the illuminated status light. Further, where the server units 111 and 113 are provided in a dark finish (e.g., black finish), contrast between a face of a server unit and an illuminated status light is enhanced. As mentioned, keyed components can act to ensure that handles face the same direction, which can reduce confusion and expedite replacement of a media drive (e.g., a media drive of a media drive assembly seated in a bay).

Figure 2:
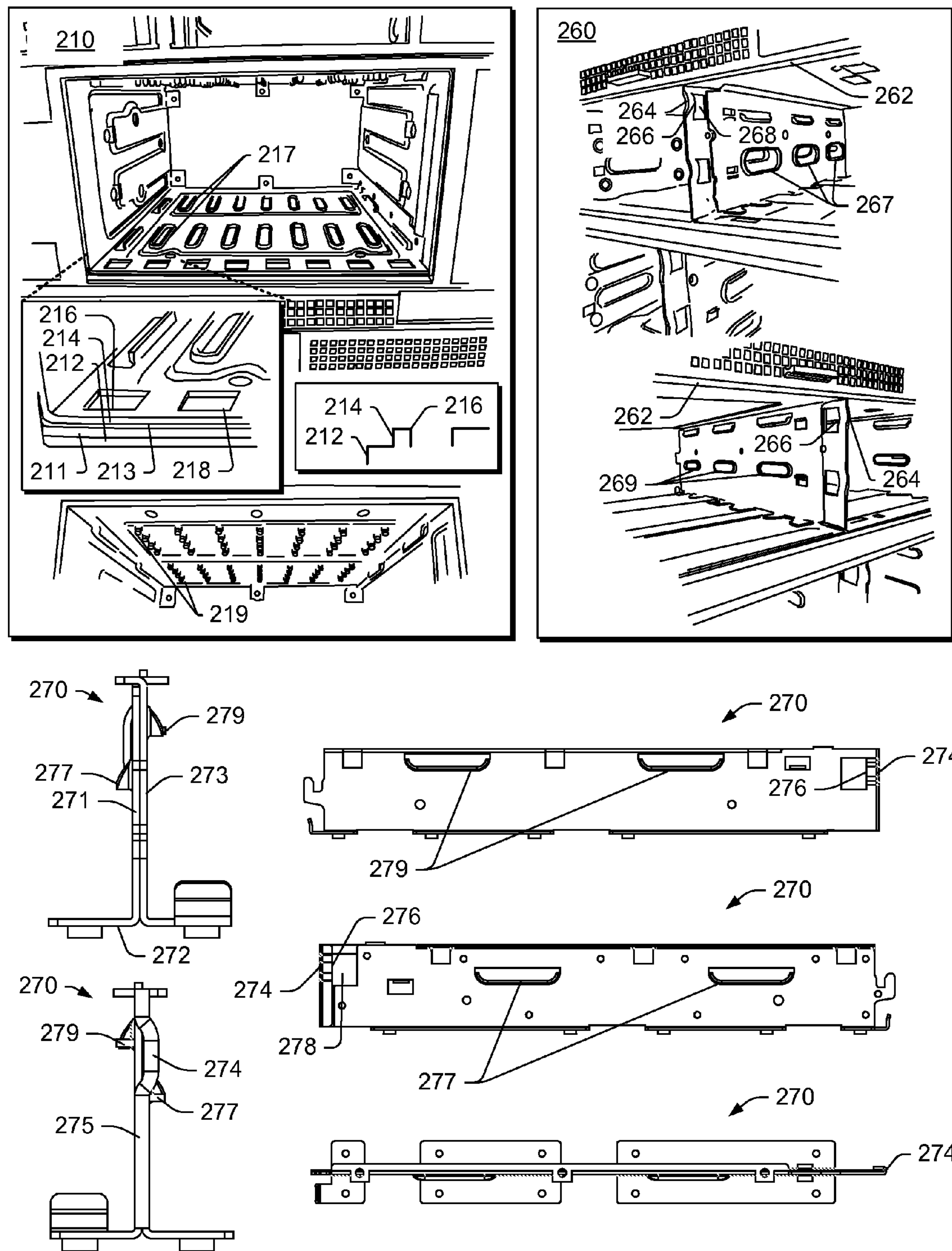
FIG. 2 is a series of diagrams of examples of bays and bay components.

FIG. 2 shows views of some examples of bays 210 and 260 and a bay component 270. The bay 210 is configured to accommodate eight media drives oriented vertically (e.g., eight individual media drive bays) and the bay 260 is configured to accommodate two media drives oriented horizontally between an end wall and an interior wall, two interior walls or two end walls (e.g., two individual media drive bays). The bay component 270 is formed from two plates 271 and 273, bent to form a base 272, and an end cover 275 (e.g., formed by a 180 degree bend of the plate 273) where each of the plates 271 and 273 is configured to abut an edge of a rail attached to a media drive along one or more punch-out portions or protrusions 277 and 279 that extend outwardly from respective plates 271 and 273. As described herein, by bending the plate 273 by 180 degrees, the end thickness is doubled, which provides for additional integrity to a surface 274. As described herein, the surface 274 can be leveraged by an end of a handle to translate a media drive assembly (e.g., to extract a media drive assembly from a bay).

Referring to the bay 210, for each media drive slot, a first front facing surface 212 steps to a shoulder with a recessed, second front facing surface 214. The recessed front facing surface 214 of the shoulder rises to a flat surface which extends inwardly in the bay to a stop surface 216, which may be, for example, an edge of an opening 218. As described herein, for the bay 210, the surface 212 may be a surface of a bezel component 211 while the recessed surface 214 and the stop 216 may be surfaces of a bay component 213 that abuts the bezel component 211. The bay component 213 includes protrusions 217 that separate and define slots where the protrusions 217 are configured to abut at least one edge of a rail attached to a media drive (e.g., one edge of one rail of a media drive and one edge of another rail of another media drive). As described herein, each of the protrusions 217 and each of the openings 218 may optionally be formed by punching a piece of sheet metal. In the example of FIG. 2, a top side of the bay 210 includes a series of nubs 219 that separate and define slots where the series of nubs 219 are configured to abut at least one edge of a rail attached to a media drive (e.g., one edge of one rail of a media drive and one edge of another rail of another media drive).

Referring to the bay 260, a first front facing surface 262 steps to a shoulder with a recessed, second front facing surface 264. The recessed front facing surface 264 traverses to a curved surface that extends inwardly to a stop 266, which may be, for example, an edge of an opening 268. As mentioned, the bay 260 is configured to receive two media drives, stacked and oriented horizontally. The bay 260 includes sets of protrusions 267 on one side and sets of protrusions 269 on another side. For example, a lower set of protrusions provide for alignment of an upper edge of a rail attached to a first media drive seated in a lower slot (e.g., a lower individual media drive bay) as well as alignment of a lower edge of another rail attached to a second media drive seated in an upper slot (e.g., an upper individual media drive bay) while an upper set of protrusions provide for alignment of a lower edge of the rail attached to the second media drive seated in the upper slot.

Various features of the bay component 270 appear correspondingly in the bay 260. For example, the surface 274 corresponds to the recessed surface 264, the stop 276 corresponds to the stop 266, and the opening 278 corresponds to the opening 268. Noting that the bay 260 includes one set of features for each slot. As shown in the example of FIG. 2, by folding an end of the plate 273 180 degrees, the thickness is doubled and the stop 276 may be formed or strengthened. As described herein, such a fold (or bend) can provide for the surface 274 and the stop 276, with sufficient integrity to lock a media drive assembly in a bay (i.e., via the stop 276) and to extract a media drive assembly from a bay (i.e., via the surface 274), for example, to translate the media drive assembly a distance that decouples a connector.

Figure 3:
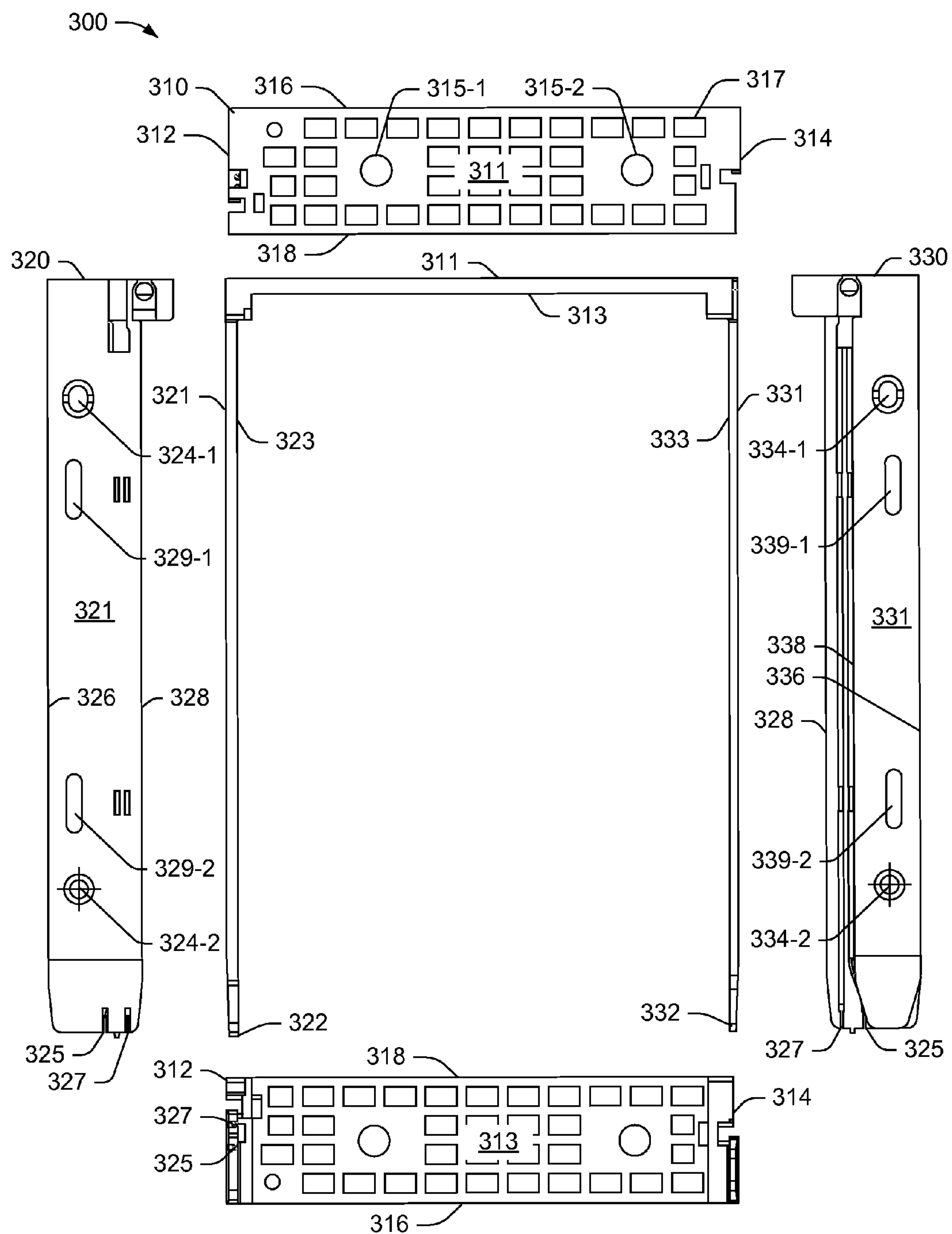
FIG. 3 is a series of views of an example of a tray for a media drive.

FIG. 3 shows various views of an example of a tray 300 with rails 320 and 330 configured for attachment to a media drive. In the example of FIG. 3, the tray 300 includes a front plate 310 with a front surface 311 and a back surface 313. As shown, the rails 320 and 330 extend outwardly from the back surface 311 perpendicular to a plane defined by the front plate 310. The front plate 310 includes opposing sides 312 and 314, a top edge 316 and a bottom edge 318. The front plate 310 includes features 315-1 and 315-2 for attachment to a handle unit (e.g., to facilitate installation and removal of a media drive from a bay). The front plate 310 also includes passages 317 for flow of air, for example, for cooling a media drive secured in the tray 310 and seated in a bay.

In the example of FIG. 3, the rails 320 and 330 are different. Specifically, one rail has a different configuration than the other rail; accordingly, the rails are asymmetric (i.e., not merely right hand/left hand mirror images). As shown, the rail 320 is larger with a greater height than the rail 330. Further, the rail 320 includes at least one light guide 325 and 327 (e.g., for transmitting light signals as to status of a media drive, etc.). The rail 320 has a free end 322, a bay side surface 321, a media drive side surface 323, a lower edge 326 and an upper edge 328. In the example of FIG. 3, the rail 320 includes attachment features 324-1 and 324-2 as well as openings 329-1 and 329-2.

As shown, the rail 330 is smaller with a smaller height than the rail 320. The rail 330 has a free end 332, a bay side surface 331, a media drive side surface 333, a lower edge 336 and an upper edge 338. In the example of FIG. 3, the rail 330 includes attachment features 334-1 and 334-2 as well as openings 339-1 and 339-2.

As described herein, various arrangements of components as assemblies can avoid accidental or otherwise unintended release of a handle from a base while providing relatively straightforward intended release. For example, current Hard Disk Drive (HDD) assemblies often have a release button that is either recessed, located behind handle, or with a protruding rim to avoid activation; all of these solutions are physical obstacles preventing the user from releasing the handle. By prohibiting the user from accessing the release button, current servers run the risk of user error due to not being able to release the HDD tray handle easily, resulting in the user damaging themselves or the unit. As described herein, in various examples, a release button for a HDD handle includes a pre-travel gap that acts to prevent accidental release of a handle. Accidental release of the handle can cause damage to the HDD tray by the user, while in transportation, or in a manufacturing setting. A pre-travel gap can be a quantified amount of movement engineered into a release button assembly mechanism before a latch releases a handle. In such an example, a user is able to push the button and release the handle but only after first overcoming the determined amount of movement (e.g., a pre-travel distance or gap).

Figure 4:
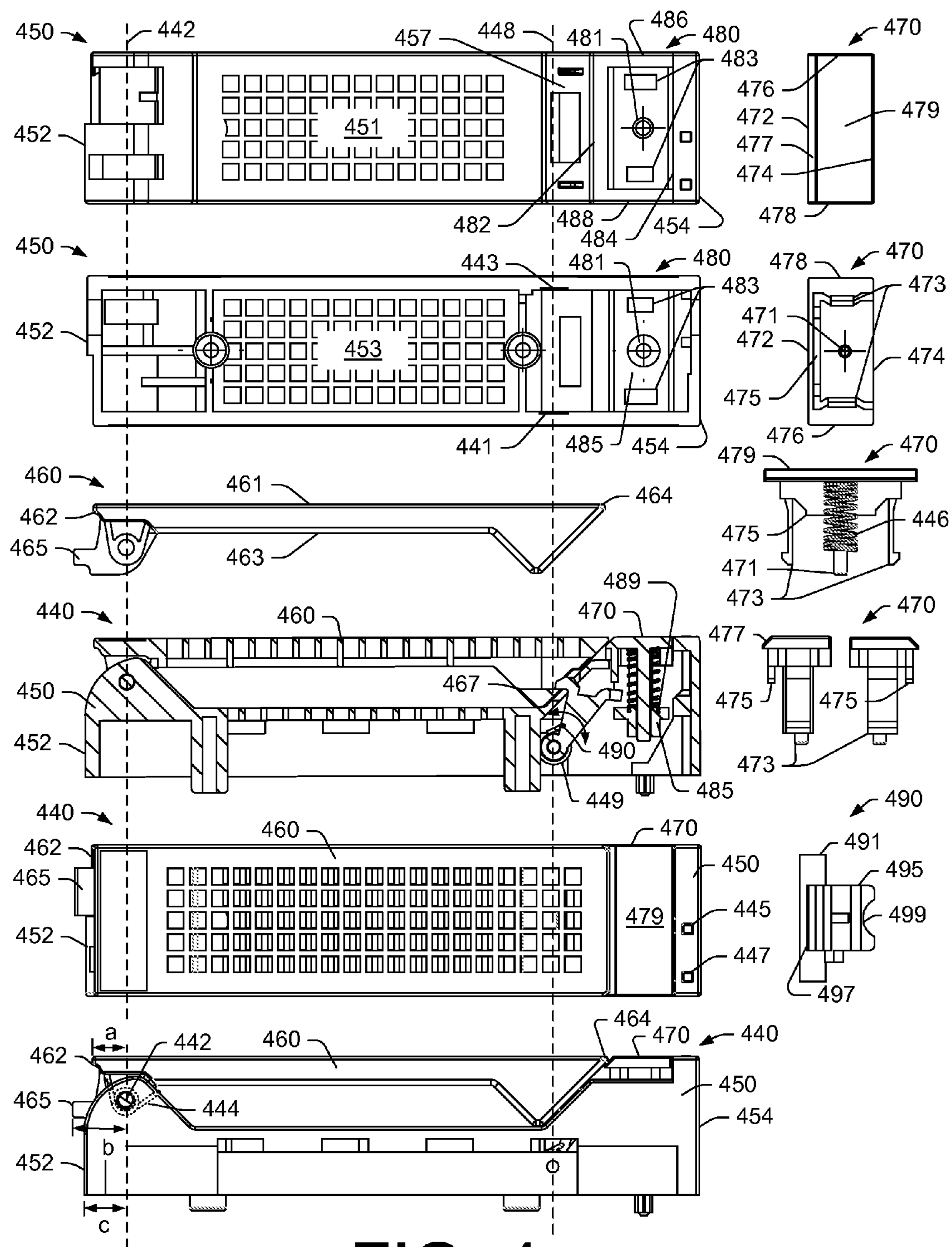
FIG. 4 is a series of views of an example of a handle unit for a media drive assembly.

FIG. 4 shows an example of a handle unit 440, which is an assembly of various components. In the example of FIG. 4, the handle unit 440 includes a base 450, a handle 460, a button 470 and a latch 490. As shown, the base 450 includes a button seat 480 for seating the button 470, which upon depression a certain distance, contacts the latch 490 for release of a swing end 462 of the handle 460 such that the handle 460 can rotate with respect to the base 450 about a hinge axis 442. In FIG. 4, a dashed line indicates the position of the hinge axis 442 and another dashed line indicates the position of a latch pivot axis 448, either along the axis or at the end of the axis. As described herein, an axis may be defined by a pin, pins or other component(s), for example, the assembly 440 may include a hinge pin along the hinge axis 442 and a latch pin along the pivot axis 448.

The base 450 include a front side 451, a back side 453, a hinge end 452 and an opposing end 454, which may be configured as a flat end. Disposed intermediate the hinge end 452 and the end 454 is a latch surface 457, which is set at an angle. In the example of FIG. 4, the base 450 also includes light guides 445 and 447, which may cooperate with the light guides 325 and 327 of the tray 300 of FIG. 3.

The button seat 480 defined by the base 450 is disposed intermediate the latch surface 457 and the end 454. The button seat 480 includes an opening 481, a pair of retainer openings or sockets 483 (e.g., of different widths), a retainer surface 485 (e.g., a button stop), a top latch side 482, an opposing side 484, an upper side 486 and a lower side 488.

In the example of FIG. 4, the button 470 includes a pair of long edges 472 and 474, a pair of short edges 476 and 478, a front side 479 and a beveled edge 477 disposed between the long edge 472 and the front side 479. Extending from a back side, the button 470 includes a stem 471, a pair of retainers 473 (e.g., of different widths), and a latch contacting surface 475.

In the example of FIG. 4, the latch 490 includes a shaft portion 491, an actuation surface 495, a prong 497 and an edge 499 with a cut-out (e.g., semi-circular in shape) to accommodate the button 470 as seated in the button seat 480 with a spring 446 (e.g., consider a cylindrical coil spring). As indicated in FIG. 4, the latch 490 can rotate about its shaft portion 491, for example, responsive to contact with the handle 460 or contact with the latch contacting surface 475 of the button 470. In the example of FIG. 4, sockets 441 and 443 are provided for receipt of respective ends of the latch 490 and for pivoting of the latch 490 about the pivot axis 448. In the example of FIG. 4, a spring 449 acts to bias the latch 490 in a counter-clockwise direction with respect to the base 450 about the pivot axis 448 (e.g., optionally defined by a pin or other feature or features).

In the example of FIG. 4, the handle 460 is shown as including a front side 461 and a back side 463, disposed between a hinge end 462 and the swing end 464. Further, the handle 460 includes a surface 467 (e.g., a latching surface which may be part of a column) that cooperates with the prong 497 of the latch 490 to maintain the handle 460 in a closed orientation with respect to the base 450. The handle 460 also includes an optional locking tab 465, which may be configured to cooperate with a stop of a bay (see, e.g., the stops 216, 266 and 276 of FIG. 2) to lock an assembly in a bay.

As described herein, an assembly can include a base with a front side, a back side, a hinge axis, a hinge end, an opposing end, a latch surface disposed intermediate the hinge end and the opposing end, a latch that includes a prong and an actuation surface, and a button seat disposed intermediate the latch surface and the opposing end where the button seat includes a button stop; a spring; and a button configured for translation in the button seat where the button includes a front side, a back side, a retainer, and a latch contacting surface extending outwardly away from the back side where, for an un-depressed orientation, the spring biases the retainer against the button stop to maintain a gap between the latch contacting surface and the actuation surface of the latch. As described herein, the gap is, at times, referred to herein as a "pre-travel" gap. Referring to FIG. 4, the button 470 may be depressed a pre-travel distance without affecting the latch 490; thus, maintaining the handle 460 in a closed or locked orientation with respect to the base 450.

As described herein, the handle 460 is configurable in a locked orientation and an unlocked orientation with respect to the base 450 where the locked orientation corresponds to a locked angle of rotation of the handle 460 about the hinge axis 442 having an end of the locking tab 465 rotated outwardly away from the hinge end 452 of the base 450, the swing end 464 of the handle 460 rotated inwardly toward the base 450 and the hinge end of the base 452 extending outwardly beyond the hinge end 462 of the handle 460 and where the unlocked orientation corresponds to an unlocked angle of rotation of the handle 460 about the hinge axis 442 having an end of the locking tab 452 rotated inwardly toward the hinge end 452 of the base 450, the swing end 464 of the handle 460 rotated outwardly away from the base 450 and the hinge end 462 of the handle 460 extending outwardly beyond the hinge end 452 of the base 450.

FIG. 4 shows distances a, b and c, which correspond to dimensions measured from the hinge axis 442 to the hinge end 462 of the handle 460 ("a"), the hinge axis 442 to an end of the locking tab 465 ("b") and from the hinge axis 442 to the hinge end of the base 452 ("c"). Accordingly, in the locked orientation, the hinge end 452 of the base 450 extends outwardly beyond the hinge end 462 of the handle 460 (i.e., $c>a$). Such an arrangement allows for the hinge end 462 of the handle 460 to contact a recessed surface (see, e.g., surfaces 214, 264 or 274) of a bay component and allow the handle 460 to be flush with a surface of a server rack or unit (see, e.g., surfaces 212 or 262).

Also shown in the example of FIG. 4, the locking tab 465 is positioned along an upper half of the assembly 440 and opposite the side with one or more status indicators 445 and 447 (see, e.g., light guides 325 and 327 of FIG. 3). Such an arrangement of features allows for the smaller rail 330 (e.g., without the light guides) to be positioned below the surface 274 of the bay component 270 (e.g., aligned per the protrusion 277) where the surface 274 can be curved inwardly towards the bay and available as a contact point for leverage by a biasing surface of the hinge end 462 of the handle 460. As shown in the bay 260 of FIG. 2, a bay component may include one such surface per slot, which, upon assembly of a bay, becomes a recessed surface (e.g., in comparison to the surface 262).

In the example of FIG. 4, a spring 444 biases the handle 460 about the hinge axis 442 with respect to the base 450. Accordingly, upon release of the swing end 464, the spring 444 causes the swing end 464 of the handle 460 to swing outwardly, rotating about the hinge axis 442 such that the hinge end 462 rotates inwardly and the locking tab 465 rotates inwardly to a chamber 455 at the hinge end 452 of the base 450.

Figure 5:
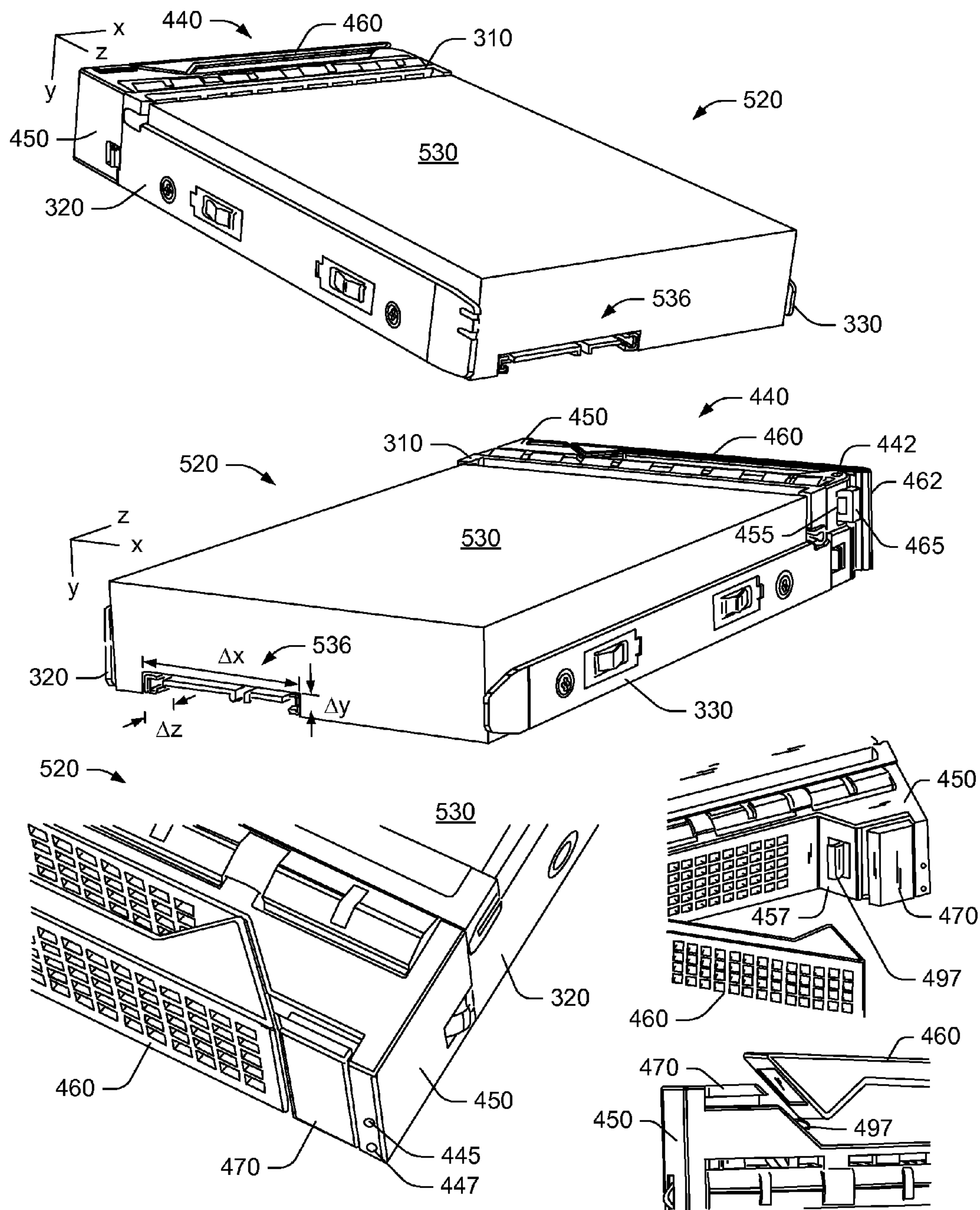
FIG. 5 is a series of perspective views of an example of an assembly with a media drive.

FIG. 5 shows various perspective views of an example of an assembly 520 that includes a media drive 530. The assembly 520 includes the tray 300 and the handle unit 440. In the example of FIG. 5, the rail 330, which has a smaller height (e.g., along a y dimension) compared to the rail 320, is attached to a side of the media drive 530 that corresponds to the hinge end 462 of the handle 460, as well as the locking tab 465.

In the example of FIG. 5, the media drive 530 is shown as having a back side connector or connectors 536 configured for connecting the media drive 530 to a power source, information bus, etc. In the example of FIG. 5, the connector 536 has a depth dimension ($\Delta z$), which represents a sliding distance, for example, between two components from being in contact with each other to fully connected or from fully connected to being disconnected from each other.

As described herein, a server unit or chassis can include one of more types of bays for receipt of one or more types of media drives where each drive is carried in a tray with a handle unit, sometimes referred to as a caddy. Such media drives may optionally be of a so-called "small form factor" (SFF), for example, consider the SFF 3.5 inch or SFF 2.5 inch standards, which are common for hard disk drives (HDDs).

A perspective front side view of the assembly 520 shows flush alignment of the base 450, the handle 460 and the button 470 (e.g., for a closed or locked orientation of handle 460 with respect to the base 450). Two perspective views of the assembly 520 show an open or unlocked orientation of the handle 460 with respect to the base 450. Also shown is the latch surface 457 of the base 450 and the prong 497 of the latch 490.

Figure 6:
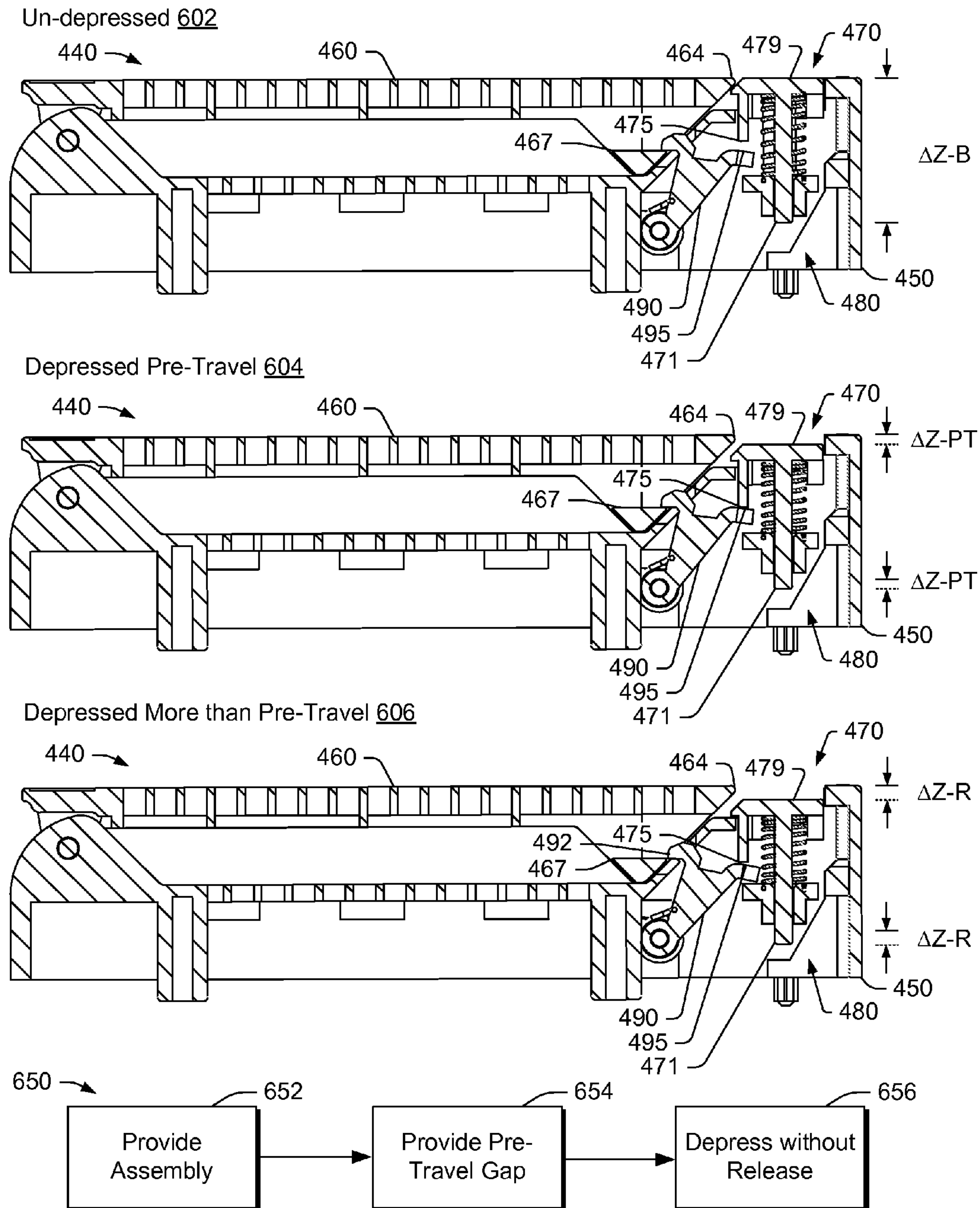
FIG. 6 is a series of cross-section views of an example of an assembly and a block diagram of a method.

FIG. 6 shows a series of three cross-sectional views of the handle unit 440 along with a block diagram of an example of a method 650. The three cross-sectional views illustrate an un-depressed state 602, a depressed pre-travel state 604 and a depressed more than pre-travel state 606 of the button 470 with respect to the base 450.

For the un-depressed state 602, the button 470 is shown as having a length ΔZ-B defined between the front side 479 and an end of the stem 471. In the depressed pre-travel state 604, the button 470 is shown as having been translated in the button seat 480 a pre-travel distance ΔZ-PT that closes the pre-travel gap between the latch contacting surface 475 of the button 470 and the actuation surface 495 of the latch 490. In other words, for the depressed pre-travel state 604, the latch contacting surface 475 is brought merely into contact with the actuation surface 495. In the depressed more than pre-travel state 606, the button 470 is shown as having been translated in the button seat 480 more than the pre-travel distance ΔZ-PT and to a release distance ΔZ-R. As indicated, for the state 606, the latch 490 rotates in a clockwise direction about its pivot axis such that the prong 492 moves away from the surface 467 to allow for release of the swing end 494 of the handle 460.

In the example of FIG. 6, the method 650 includes a provision block 652 for providing an assembly, a provision block 654 for providing a pre-travel gap in the assembly and a depression block 656 for depressing a button without releasing a handle (i.e., to maintain the assembly in a locked orientation of a handle with respect to a base).

As described herein, a method can include providing an assembly having a handle, a base, a button and a latch where the button is configured to actuate the latch to unlock the handle and allow for rotation of the handle with respect to the base about a hinge axis; and providing a gap between a latch contacting surface of the button and an actuation surface of the latch where the gap is configured to allow for depression of the button without unlocking of the handle. In such a method, providing an assembly can include providing the assembly in a locked orientation defined by a prong of the latch contacting a latching surface of the handle. As described herein, providing an assembly can include providing a face of a button aligned with a face of a handle.

As mentioned, conventional server units include bays for installation of media drives such as hard disk drives (HDDs). Such media drives are usually carried in an assembly that allows for installation and removal of a media drive. Often, such an assembly includes a handle with a release button that, when depressed, causes release of the handle, which may swing out away from a unit (e.g., consider a server unit in a rack or tower). As described herein, various arrangements provide for reducing or otherwise minimizing accidental or otherwise unintended release of a handle of a media drive assembly, which may occur, for example, during shipping of a media drive assembly, while a media drive assembly is stored, while a media drive is installed in a unit, etc. As described herein, a method that provides an assembly with a pre-travel gap (see, e.g., the assembly 440 of FIG. 4 or the media drive assembly 520 of FIG. 5) may include shipping, storing, installing, operating, etc. with reduced risk of accidental or otherwise unintended release of a handle of the assembly.

Figure 7:
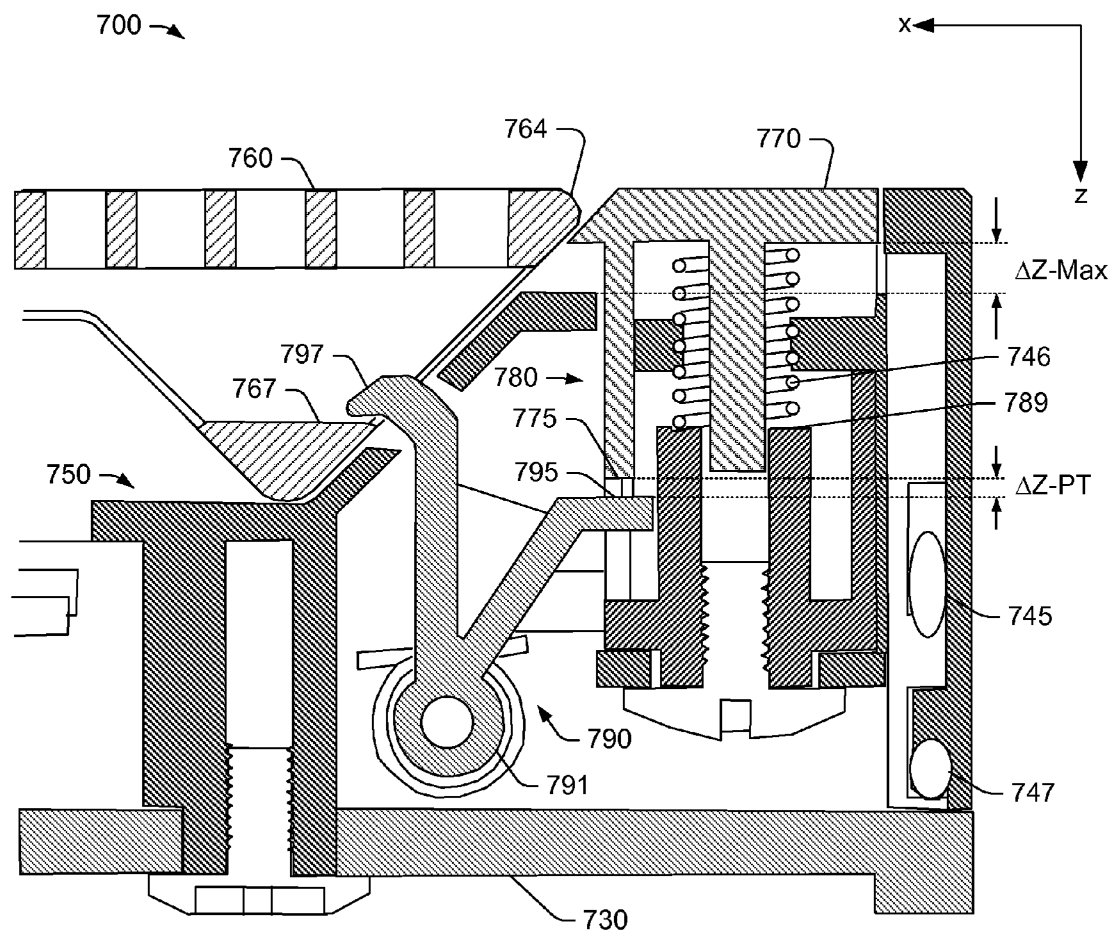
FIG. 7 is a cross-sectional view of an example of an assembly.

FIG. 7 shows a cross-sectional view of an example of an assembly 700. In the example of FIG. 7, the assembly 700 includes a tray 730, a base 750, a handle 760, a button 770 seated in a button seat 780, and a latch 790. In the view of FIG. 7, the assembly 700 is also shown as including one or more light guides 745 and 747, which may transmit a light signal (e.g., status signal) to a face of the assembly 700.

In the example of FIG. 7, the assembly 700 includes a pre-travel gap ΔZ-PT, which is a distance that the button 770 may be depressed in the button seat 780 without actuating the latch 790. More specifically, the pre-travel gap ΔZ-PT is defined as existing between a latch contacting surface 775 of the button 770 and an actuation surface 795 of the latch 790. In the illustrated resting state of the assembly 700, a front surface of the base 750, a front surface of the handle 760 and a front surface of the button 770 may be aligned (e.g., across the x-dimension with respect to a z-coordinate). In the example of FIG. 7, a maximum travel distance ΔZ-Max is defined between a surface of the button 770 and a surface of the base 750. As described herein, by depressing a button a maximum travel distance, a latch is actuated to unlatch a handle. Further, a pre-travel distance is a fraction of the maximum travel distance. In various examples, a pre-travel distance may be about 50% or less of a maximum travel distance. In general, a greater pre-travel distance (e.g. in absolute terms) reduces the less risk of unintended release of a locked handle.

As described herein, an assembly can include one or more processors configured to execute instructions stored in memory; memory configured to store processor-executable instructions; a media drive configured to store information and to respond to instructions executed by at least one of the one or more processors; and a subassembly configured to carry the media drive. In such an example the subassembly can include a base attached to the media drive where the base has a front side, a back side, a hinge axis, a hinge end, an opposing end, a latch surface disposed intermediate the hinge end and the opposing end, a latch with a prong and an actuation surface, and a button seat disposed intermediate the latch surface and the opposing end where the button seat comprises a button stop; a handle configured for rotation about the hinge axis where the handle has a front side, a back side, a hinge end and a swing end, the swing end configured for receipt of the prong of the latch; and a spring-biased button configured for translation in the button seat where the button has a front side, a back side, a retainer, and a latch contacting surface extending outwardly away from the back side where spring-bias sits the retainer of the button against the button stop to form a pre-travel gap between the latch contacting surface and the actuation surface of the latch. In such an example, the front side of the handle and the front side of the button may align to form a substantially flush-faced assembly (e.g., in a closed or locked orientation). As described herein, a spring-biased button can include a stem and a coil spring disposed about the stem and where a button seat includes a bore (e.g., an opening) configured for receipt of the stem and a surrounding surface configured to seat an end of the coil spring (see, e.g., the surface 489 of FIG. 4 or the surface 789 of FIG. 7).

As described herein, an assembly can include a spring that biases a retainer of a button against a button stop to align a front side of the button and a front side of a base. As described herein, an assembly can include a handle configured for rotation about a hinge axis where the handle includes a front side, a back side, a hinge end and a swing end where the swing end is configured for receipt of a prong of a latch disposed, at least partially, in a base. In such an example, a spring can bias a retainer of a button against a button stop to align a front side of the button and a front side of the handle. In various examples, an assembly includes a swing end of a handle with a bevel disposed at an angle, where a button includes a bevel disposed at an approximately complimentary angle. In such arrangements, a spring may bias a retainer of a button against a button stop to dispose the bevels adjacent to each other.

As described herein, an assembly can include a latch surface of a base that includes a bevel disposed at an angle and where a button includes a bevel disposed at approximately the same angle. As described herein, a swing end of a handle can include a bevel disposed at an angle and a latch surface of a base can include a bevel disposed at an approximately complimentary angle. In such an example, a button can include a bevel disposed at approximately the same angle as the latch surface of the base. In various examples, a bevel of a swing end of a handle may be a frame that defines an opening where a latching surface adjacent the opening allows for seating of a prong of a latch to lock the handle with respect to a base.

As described herein, an assembly can include a button with a stem extending outwardly from the back side of the button where the stem defines a translation axis of the button and where, for a first orientation defined by translation of the button in the button seat an axial distance equal to the gap, a latch contacting surface of the button contacts an actuation surface of the latch. In such an example, a second orientation is defined by translation of the button in the button seat an axial distance greater than the gap where the latch contacting surface of the button contacts the actuation surface of the latch and can, upon further translation, rotate a prong of the latch away from a latch surface of the base.

As described herein, an assembly with a handle and a base can include a pre-travel gap that, for translation of a button in a button seat, avoids contact between a latch contacting surface of the button and an actuation surface of a latch (e.g., to maintain the handle in a locked orientation with respect to the base).

As described herein, an assembly can include a button with two retainers and a button seat of a base with two sockets, each socket configured for receipt of a respective one of the retainers. As described herein, a button can include a stem extending outwardly from a back side of the button and a coil spring aligned with the stem. In such an example, a button seat of a base can include a bore configured for receipt of the stem and a surface surrounding the bore for seating the coil spring.

The term "circuit" or "circuitry" may be used herein (e.g., in the summary, description, and/or claims). As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 8:
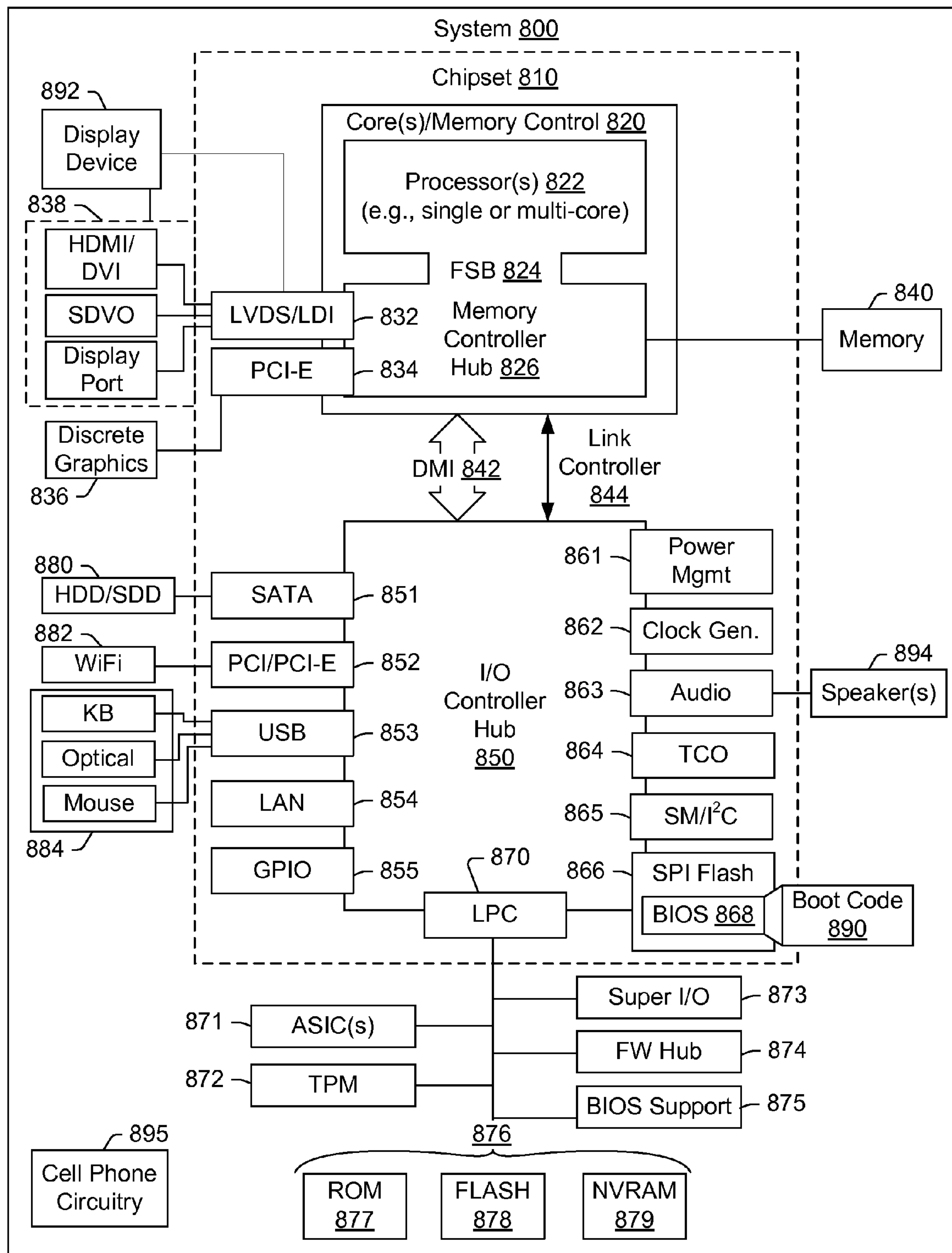
FIG. 8 is a diagram of an example of a machine.

While various examples of circuits or circuitry may be shown or discussed, FIG. 8 depicts a block diagram of an illustrative computer system 800. The system 800 may be a desktop computer system, such as one of the ThinkCentre® or ThinkPad® series of personal computers sold by Lenovo (US) Inc. of Morrisville, N.C., or a workstation computer, such as the ThinkStation® workstation computer sold by Lenovo (US) Inc. of Morrisville, N.C.; however, as apparent from the description herein, a satellite, a base, a server or other machine may include other features or only some of the features of the system 800 (e.g., consider the ThinkServer® server sold by Lenovo (US) Inc. of Morrisville, N.C.).

As shown in FIG. 8, the system 800 includes a so-called chipset 810. A chipset refers to a group of integrated circuits, or chips, that are designed to work together. Chipsets are usually marketed as a single product (e.g., consider chipsets marketed under the brands INTEL®, AMD®, etc.).

In the example of FIG. 8, the chipset 810 has a particular architecture, which may vary to some extent depending on brand or manufacturer. The architecture of the chipset 810 includes a core and memory control group 820 and an I/O controller hub 850 that exchange information (e.g., data, signals, commands, etc.) via, for example, a direct management interface or direct media interface (DMI) 842 or a link controller 844. In the example of FIG. 8, the DMI 842 is a chip-to-chip interface (sometimes referred to as being a link between a "northbridge" and a "southbridge").

The core and memory control group 820 include one or more processors 822 (e.g., single core or multi-core) and a memory controller hub 826 that exchange information via a front side bus (FSB) 824. As described herein, various components of the core and memory control group 820 may be integrated onto a single processor die, for example, to make a chip that supplants the conventional "northbridge" style architecture.

The memory controller hub 826 interfaces with memory 840. For example, the memory controller hub 826 may provide support for DDR SDRAM memory (e.g., DDR, DDR2, DDR3, etc.). In general, the memory 840 is a type of random-access memory (RAM). It is often referred to as "system memory".

The memory controller hub 826 further includes a low-voltage differential signaling interface (LVDS) 832. The LVDS 832 may be a so-called LVDS Display Interface (LDI) for support of a display device 892 (e.g., a CRT, a flat panel, a projector, etc.). A block 838 includes some examples of technologies that may be supported via the LVDS interface 832 (e.g., serial digital video, HDMI/DVI, display port). The memory controller hub 826 also includes one or more PCI-express interfaces (PCI-E) 834, for example, for support of discrete graphics 836. Discrete graphics using a PCI-E interface has become an alternative approach to an accelerated graphics port (AGP). For example, the memory controller hub 826 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 850 includes a variety of interfaces. The example of FIG. 8 includes a SATA interface 851, one or more PCI-E interfaces 852 (optionally one or more legacy PCI interfaces), one or more USB interfaces 853, a LAN interface 854 (more generally a network interface), a general purpose I/O interface (GPIO) 855, a low-pin count (LPC) interface 870, a power management interface 861, a clock generator interface 862, an audio interface 863 (e.g., for speakers 894), a total cost of operation (TCO) interface 864, a system management bus interface (e.g., a multi-master serial computer bus interface) 865, and a serial peripheral flash memory/controller interface (SPI Flash) 866, which, in the example of FIG. 8, includes BIOS 868 and boot code 890. With respect to network connections, the I/O hub controller 850 may include integrated gigabit Ethernet controller lines multiplexed with a PCI-E interface port. Other network features may operate independent of a PCI-E interface.

The interfaces of the I/O hub controller 850 provide for communication with various devices, networks, etc. For example, the SATA interface 851 provides for reading, writing or reading and writing information on one or more drives 880 such as HDDs, SDDs or a combination thereof. The I/O hub controller 850 may also include an advanced host controller interface (AHCI) to support one or more drives 880. The PCI-E interface 852 allows for wireless connections 882 to devices, networks, etc. The USB interface 853 provides for input devices 884 such as keyboards (KB), one or more optical sensors, mice and various other devices (e.g., microphones, cameras, phones, storage, media players, etc.). On or more other types of sensors may optionally rely on the USB interface 853 or another interface (e.g., $I^2C$, etc.).

In the example of FIG. 8, the LPC interface 870 provides for use of one or more ASICs 871, a trusted platform module (TPM) 872, a super I/O 873, a firmware hub 874, BIOS support 875 as well as various types of memory 876 such as ROM 877, Flash 878, and non-volatile RAM (NVRAM) 879. With respect to the TPM 872, this module may be in the form of a chip that can be used to authenticate software and hardware devices. For example, a TPM may be capable of performing platform authentication and may be used to verify that a system seeking access is the expected system.

The system 800, upon power on, may be configured to execute boot code 890 for the BIOS 868, as stored within the SPI Flash 866, and thereafter processes data under the control of one or more operating systems and application software (e.g., stored in system memory 840). An operating system may be stored in any of a variety of locations and accessed, for example, according to instructions of the BIOS 868. Again, as described herein, a satellite, a base, a server or other machine may include fewer or more features than shown in the system 800 of FIG. 8. Further, the system 800 of FIG. 8 is shown as optionally including cell phone circuitry 895, which may include GSM, CDMA, etc., types of circuitry configured for coordinated operation with one or more of the other features of the system 800.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An assembly comprising:

a base that comprises a front side, a back side, a hinge axis, a hinge end, an opposing end, a latch surface disposed intermediate the hinge end and the opposing end, a latch that comprises a prong and an actuation surface, and a button seat disposed intermediate the latch surface and the opposing end wherein the button seat comprises a button stop;

a spring; and a button configured for translation in the button seat wherein the button comprises a front side, a back side, a retainer, a stem extending outwardly from the back side, and a latch contacting surface extending outwardly away from the back side wherein, for a first orientation, the spring biases the retainer against the button stop to maintain a gap between the latch contacting surface and the actuation surface of the latch and wherein, for a second orientation defined by translation of the button in the button seat an axial distance greater than the gap, the latch contacting surface of the button contacts the actuation surface of the latch and rotates the prong of the latch away from the latch surface of the base.

2. The assembly of claim 1 wherein the spring biases the retainer against the button stop to align the front side of the button and the front side of the base at the opposing end.

3. The assembly of claim 1 further comprising a handle configured for rotation about the hinge axis wherein the handle comprises a front side, a back side, a hinge end and a swing end, the swing end configured for receipt of the prong of the latch.

4. The assembly of claim 3 wherein the spring biases the retainer against the button stop to align the front side of the button and the front side of the handle.

5. The assembly of claim 3 wherein the swing end of the handle comprises a bevel disposed at an angle, wherein the button comprises a bevel disposed at an approximately complimentary angle and wherein the spring biases the retainer against the button stop to dispose the bevels adjacent to each other.

6. The assembly of claim 1 wherein the latch surface of the base comprises a bevel disposed at an angle and wherein the button comprises a bevel disposed at approximately the same angle.

7. The assembly of claim 3 wherein the swing end of the handle comprises a bevel disposed at an angle and wherein the latch surface of the base comprises a bevel disposed at an approximately complimentary angle.

8. The assembly of claim 7 wherein the button comprises a bevel disposed at approximately the same angle as the latch surface of the base.

9. The assembly of claim 1 wherein the gap comprises a pre-travel gap that, for translation of the button in the button seat over a pre-travel gap distance, avoids contact between the latch contacting surface of the button and the actuation surface of the latch.

10. The assembly of claim 1 wherein the button comprises two retainers and wherein the button seat of the base comprises two sockets, each socket configured for receipt of a respective one of the retainers.

11. The assembly of claim 1 wherein the spring comprises a coil spring aligned with the stem.

12. The assembly of claim 11 wherein the button seat of the base comprises a bore configured for receipt of the stem and a surface surrounding the bore for seating the coil spring.

13. A method comprising:

providing an assembly that comprises a handle, a base that comprises a latch surface, a button, a button seat and a latch that comprises a prong, wherein the button comprises a stem extending outwardly from the back side of the button, wherein the stem defines a translation axis of the button and wherein the button is configured to actuate the latch to unlock the handle and allow for rotation of the handle with respect to the base about a hinge axis; and providing a gap between a latch contacting surface of the button and an actuation surface of the latch, the gap configured to allow for depression of the button without unlocking of the handle wherein for translation of the button in the button seat an axial distance greater than the gap, the latch contacting surface of the button contacts the actuation surface of the latch and rotates the prong of the latch away from the latch surface of the base.

14. The method of claim 13 wherein the providing an assembly comprises providing the assembly in a locked orientation defined by the prong of the latch contacting a latching surface of the handle.

15. The method of claim 13 wherein the providing an assembly comprises providing a face of the button aligned with a face of the handle.

16. An assembly comprising:

one or more processors configured to execute instructions stored in memory;

memory configured to store processor-executable instructions;

a media drive configured to store information and to respond to instructions executed by at least one of the one or more processors;

a subassembly configured to carry the media drive wherein the assembly comprises a base that comprises a front side, a back side, a hinge axis, a hinge end, an opposing end, a latch surface disposed intermediate the hinge end and the opposing end, a latch that comprises a prong and an actuation surface, and a button seat disposed intermediate the latch surface and the opposing end wherein the button seat comprises a button stop;

a handle configured for rotation about the hinge axis wherein the handle comprises a front side, a back side, a hinge end and a swing end, the swing end configured for receipt of the prong of the latch; and a spring-biased button configured for translation in the button seat wherein the button comprises a front side, a back side, a retainer, a stem extending outwardly from the back side of the button that defines a translation axis of the button, and a latch contacting surface extending outwardly away from the back side of the button wherein spring-bias sits the retainer of the button against the button stop to form a pre-travel gap between the latch contacting surface and the actuation surface of the latch and wherein for an orientation defined by translation of the button in the button seat an axial distance greater than the pre-travel gap, the latch contacting surface of the button contacts the actuation surface of the latch and rotates the prong of the latch away from the latch surface of the base.

17. The assembly of claim 16 wherein the front side of the handle and the front side of the button align to form a substantially flush-faced assembly.

18. The assembly of claim 16 wherein the spring-biased button comprises a coil spring disposed about the stem and wherein the button seat comprises a bore configured for receipt of the stem and a surrounding surface configured to seat an end of the coil spring.

19. An assembly comprising:

a base that comprises a front side, a back side, a hinge axis, a hinge end, an opposing end, a latch surface disposed intermediate the hinge end and the opposing end, a latch that comprises a prong and an actuation surface, and a button seat disposed intermediate the latch surface and the opposing end wherein the button seat comprises a button stop;

a spring; and a button configured for translation in the button seat wherein the button comprises a front side, a back side, a retainer, and a latch contacting surface extending outwardly away from the back side wherein, for an un-depressed orientation, the spring biases the retainer against the button stop to maintain a gap between the latch contacting surface and the actuation surface of the latch wherein the gap comprises a pre-travel gap that, for translation of the button in the button seat over a pre-travel gap distance, avoids contact between the latch contacting surface of the button and the actuation surface of the latch.

20. An assembly comprising:

a base that comprises a front side, a back side, a hinge axis, a hinge end, an opposing end, a latch surface disposed intermediate the hinge end and the opposing end, a latch that comprises a prong and an actuation surface, and a button seat disposed intermediate the latch surface and the opposing end wherein the button seat comprises a button stop and two sockets;

a spring; and a button configured for translation in the button seat wherein the button comprises a front side, a back side, two retainers, and a latch contacting surface extending outwardly away from the back side wherein each one of the sockets of the button seat is configured for receipt of a respective one of the retainers of the button and wherein, for an un-depressed orientation, the spring biases the retainer against the button stop to maintain a gap between the latch contacting surface and the actuation surface of the latch.

* * * * *